May 29, 1951      D. BIERMANN      2,554,611
HYDRAULICALLY OPERATED VARIABLE PITCH PROPELLER
Filed Nov. 5, 1945      4 Sheets-Sheet 1
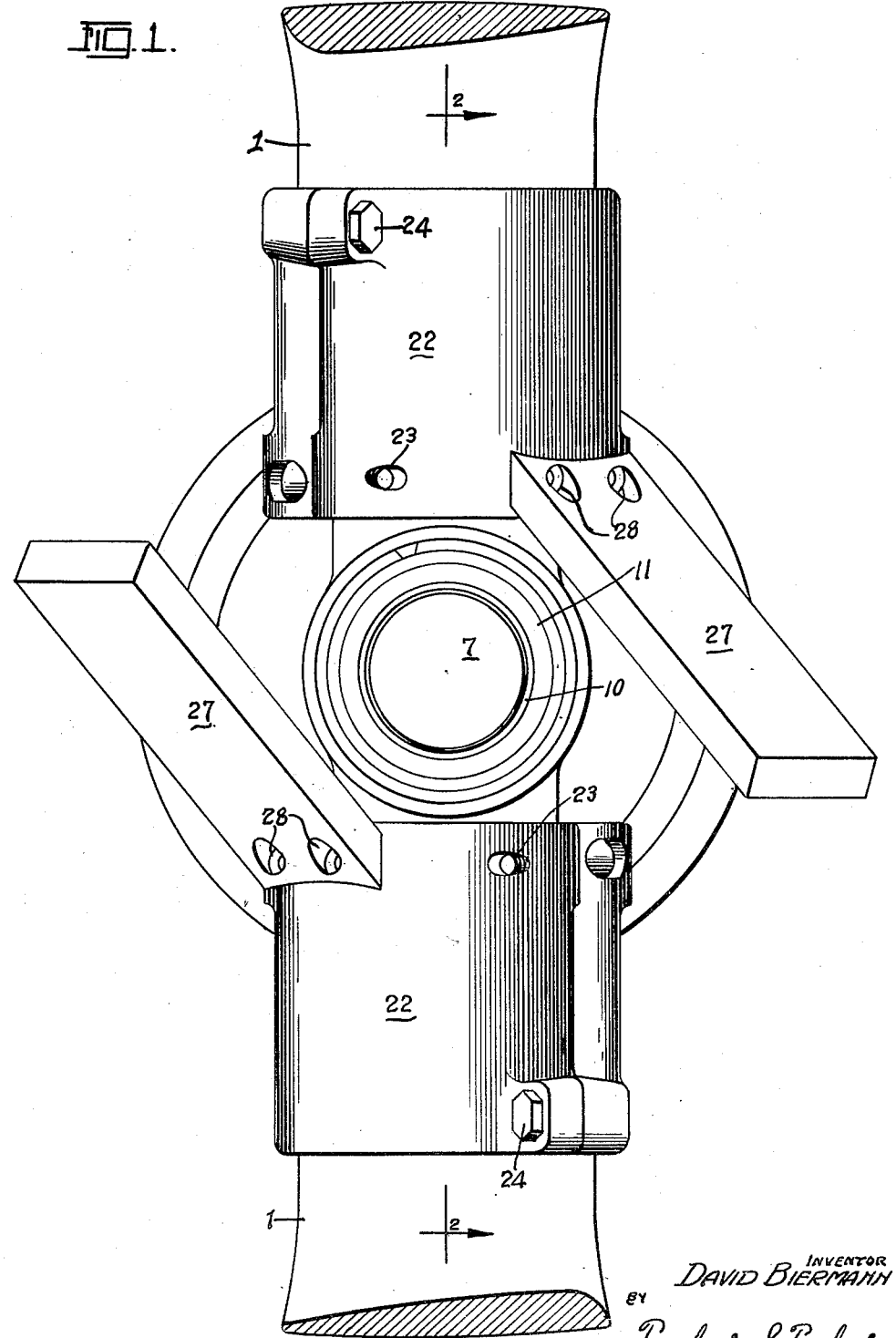
INVENTOR
DAVID BIERMANN
BY
Toulmin & Toulmin
ATTORNEYS

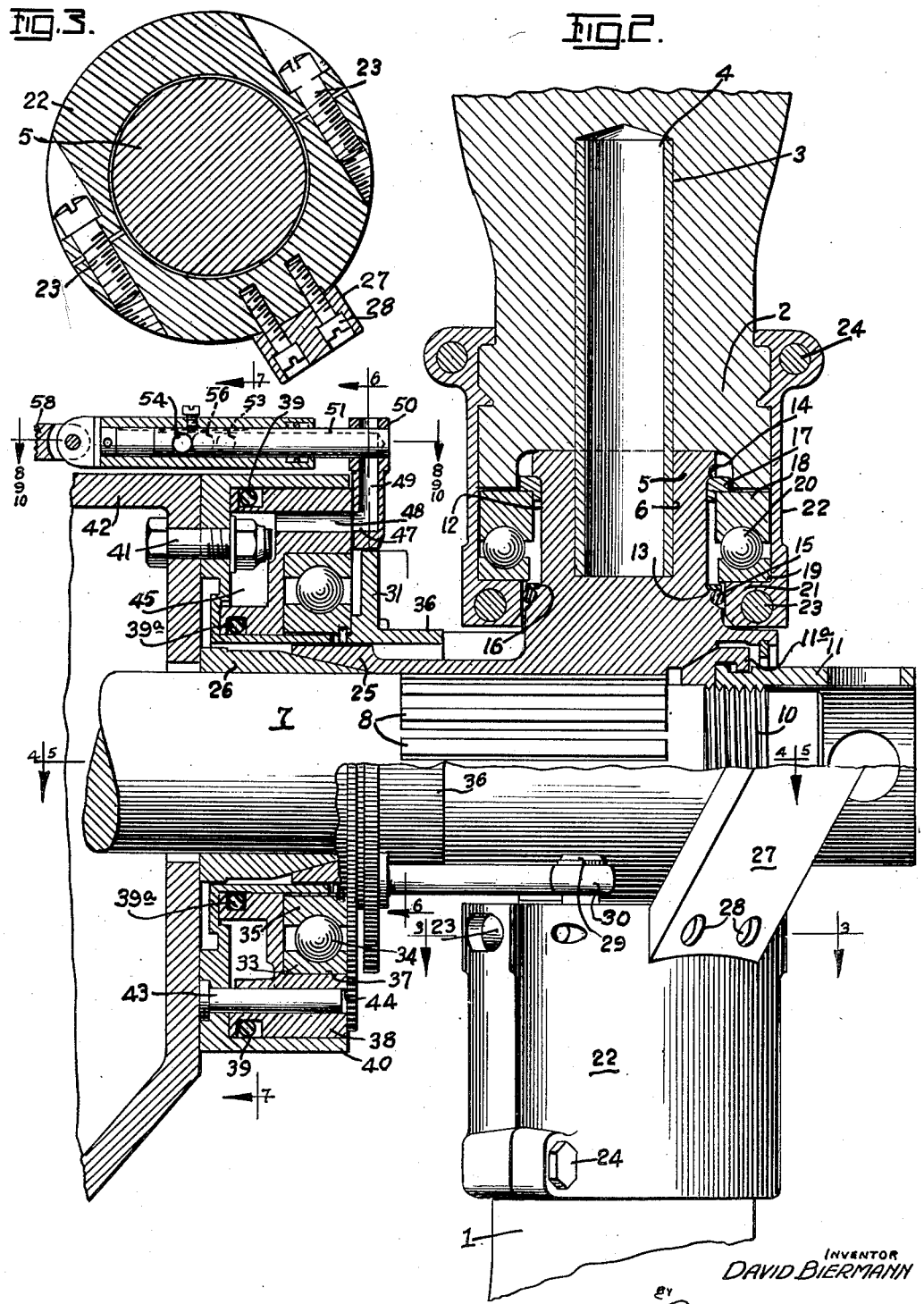

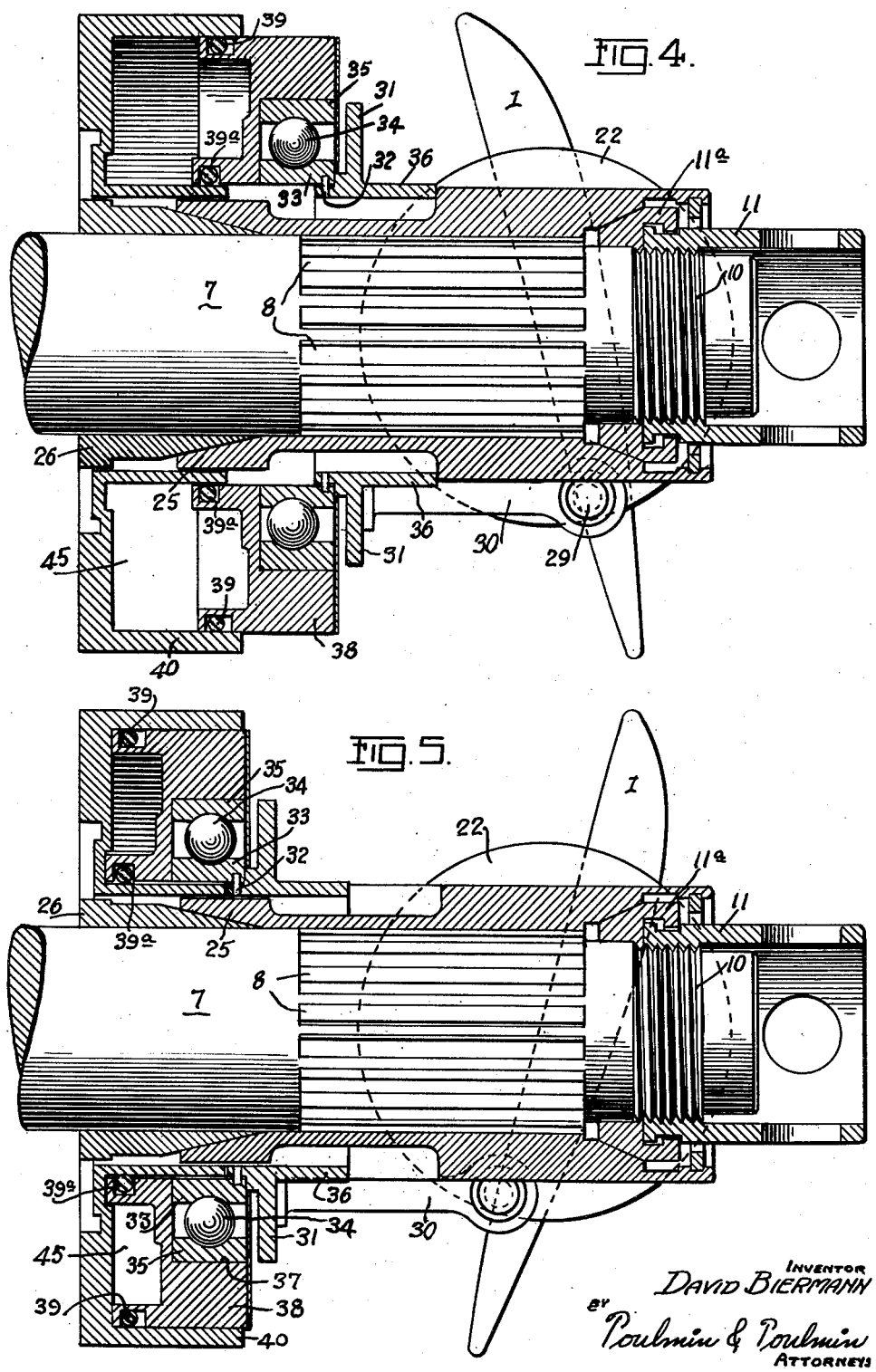

May 29, 1951     D. BIERMANN     2,554,611
HYDRAULICALLY OPERATED VARIABLE PITCH PROPELLER
Filed Nov. 5, 1945     4 Sheets-Sheet 4
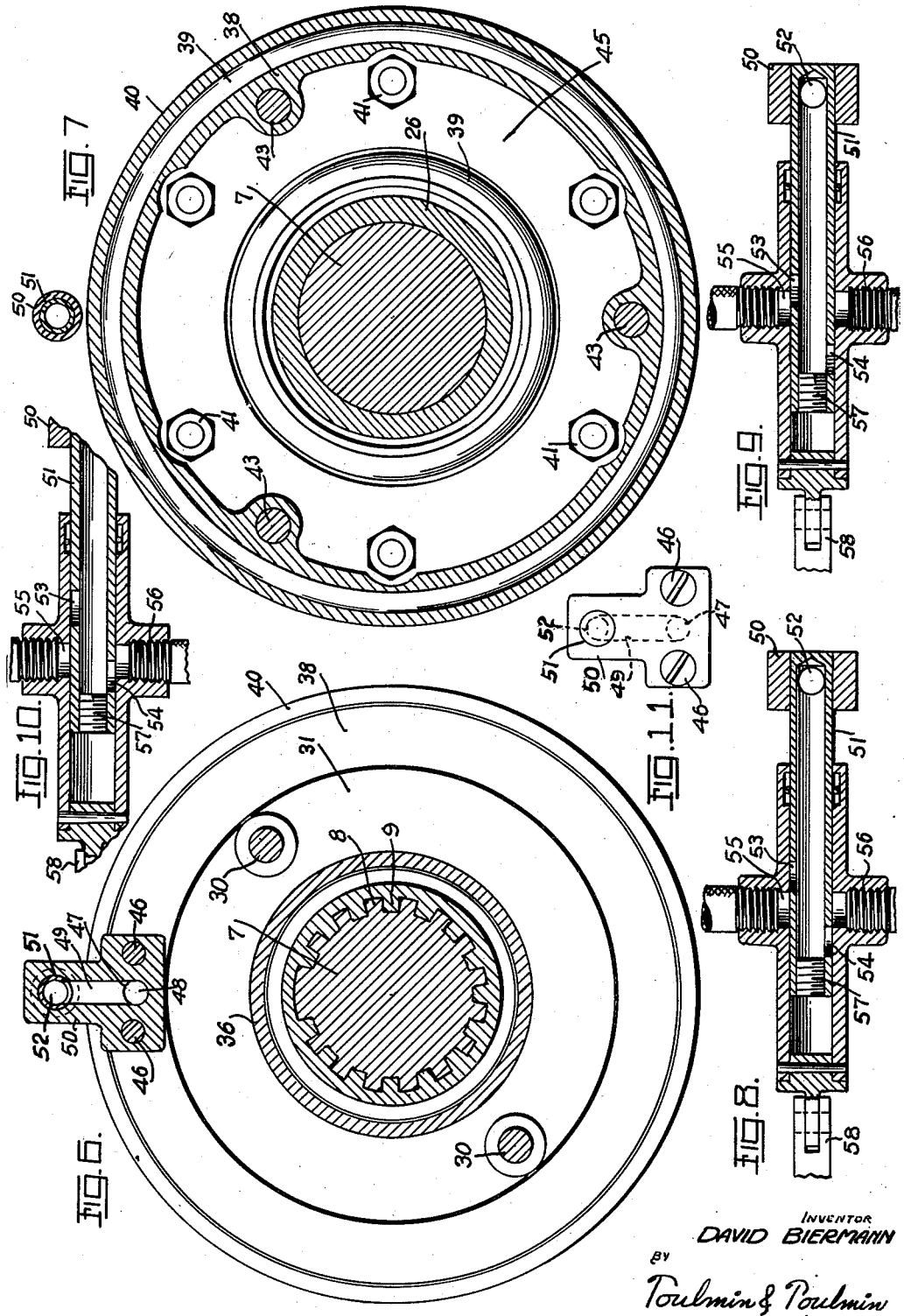
INVENTOR
DAVID BIERMANN
BY
Toulmin & Toulmin
ATTORNEYS Patented May 29, 1951

2,554,611

UNITED STATES PATENT OFFICE 2,554,611

HYDRAULICALLY OPERATED VARIABLE PITCH PROPELLER

David Biermann, Piqua, Ohio, assignor of one-half to Hartzell Industries Inc., Piqua, Ohio, a corporation of Ohio Application November 5, 1945, Serial No. 626,841

8 Claims. (Cl. 170—160.37)

1

This invention relates to airscrews and has particular reference to airscrews used for the propulsion of aircraft.

It is the object of this invention to provide an adjustable airscrew or propeller in order to obtain maximum efficiency under all conditions of air speeds and altitudes while at the same time absorbing the desired engine power at the desired engine speed.

It is the object of this invention to provide means for varying the pitch of the airscrew or propeller.

It is particularly the object of this invention to provide such means and mechanism for relatively low horsepower engines of 300 H. P. and below, although this invention is adaptable equally to higher horsepowers.

It is the object of this invention to devise a mechanism that is light in weight, simple to manufacture and repair or adjust, and a mechanism which will adjust the propeller during flight to any desired value between predetermined limits.

It is a further object to provide a hydraulic jacking mechanism mounted upon the crankcase of the engine and located in the rear of the propeller blades so that hydraulic fluid can be piped to the mechanism without altering the engine, the engine shaft, or placing the hydraulic equipment in front of the propeller blades.

It is a further object of this invention to provide for the mounting of the hydraulic mechanism on the non-rotating engine crankcase to eliminate centrifugal force acting on the hydraulic fluid, which would cause the mechanism to leak.

It is a further object to provide for the location of the jacking unit at the rear of the hub.

It is an additional object to provide means of mounting the propeller blades in a novel manner and for demounting them, in association with the actuating mechanism of the hydraulic jack so as to provide for their rotation in adjustment in opposite directions while in flight.

It is an object to provide a small compact hub which can be easily forged to close limits and machined at a minimum of cost, and which is formed in such a way that the bearings fit around the radial arms.

It is an object of the invention to use clamp rings to transmit the centrifugal force from the blade flange to the blade thrust bearings so as to secure both an inexpensive construction while allowing for a simple pitch adjustment of the propeller blade to any value.

2

It is a further object to provide for clamp rings for retaining the propeller blades on the hub so that they rotate with the blades when the pitch is changed and so that they are arranged external to the other parts of the hub assembly.

It is a further object of this invention to provide for the location of the bearing relative to the blade so that the bearing does not have to be assembled on the blade, thereby permitting the use of a relatively small and inexpensive bearing.

It is a further object of this invention to provide a novel means of attaching the counterweights and of locating the counterweights so that the centrifugal force exerted is small due to the mounting close to the center of rotation.

It is a further object to provide for a quick and ready means of disassembling the blades by the removal of four screws per blade.

It is a further object to provide a hydraulic metering mechanism for accurate control and accurate positioning of the blades.

It is an object to provide positive movement to decrease pitch by the use of oil pressure and positive movement in the reverse direction to increase pitch through centrifugal force acting on the counterweights.

Referring to the drawings:

Figure 1 is a front elevation of the hub, propeller clamps and counterweights.

Figure 2 is a section on the line 2—2 of Figure 1, looking in the direction of the arrows.

Figure 3 is a section on the line 3—3 of Figure 2, looking in the direction of the arrows, illustrating the means of attachment of the counterweights and means of causing the bifurcated clamping ring to be attached to the propeller hub.

Figure 4 is a section on the line 4—4 of Figure 2, looking in the direction of the arrows, showing the parts when the blades of the propeller have achieved the maximum negative pitch used for braking the movement of the plane.

Figure 5 is a similar view on the line 5—5 of Figure 2, looking in the direction of the arrows, showing the maximum positive pitch of the blades used during high speed of the airplane with the hydraulic mechanism in its retracted position.

Figure 6 is a section on the line 6—6 of Figure 2, looking in the direction of the arrows, showing a portion of the hub and actuating mechanism in elevation and a portion of the hydraulic mechanism and shaft in section with associated, attached hub.

Figure 7 is a section on the line 7—7 of Figure 2, looking in the direction of the arrows, illustrating the means and method of attachment of the hydraulic jack to the crankcase.

Figure 8 is a section on the line 8—8 of Figure 2, looking in the direction of the arrows, showing the hydraulic valve control parts in position for locking of the blades in a predetermined position.

Figure 9 is a section on the line 9—9 of Figure 2, looking in the direction of the arrows, showing the hydraulic parts of the hydraulic control valve in position to positively decrease the pitch of the propeller.

Figure 10 is a section on the line 10—10 of Figure 2, looking in the direction of the arrows, showing the servo valve mechanism of Figures 8 and 9 in position to exhaust the accumulated pressure in the hydraulic system so that the propeller may retract from advanced pitch position to high pitch position. This retraction is accomplished by the action of centrifugal force upon the counterbalancing weights.

Figure 11 is a detailed view in elevation of the connection between the port block and the piston.

Referring to the drawings in detail, 1 designates a propeller blade having a shank or hub 2 recessed at 3 for receiving a driving shaft or sleeve 4, the other end of which is mounted in the hub 5 in a recess 6. The hub 5 is mounted upon the engine shaft 7 by the interlocking splines 8 and 9. The threaded end of the shaft 10 is provided with a lock nut 11 which interlocks with the hub 5 through the interlocking cone 11a. The hub 5 is provided with a groove 12 having a lower shoulder 13 and an upper shoulder 14. Mounted in the hub adjacent to the lower shoulder 13 is a sealing ring 15, and above it a snap ring 16. The upper shoulder 14 carries a split ring 17, which in turn engages with the upper ball race 18. The remainder of the ball bearing consists of the race 19 and balls 20. This bearing is held in position by being engaged by the flange 21 of the clamping ring 22 which is made in two parts and held together as shown in Figure 3 by the lower retaining bolts 23 and the upper retaining bolts 24.

In assembly of the mechanism just described, the procedure is as follows. Seal 15 is slipped past its groove. The snap ring 16 is slipped into the groove normally occupied by seal 15. The ball bearing consisting of the parts 18, 19 and 20 is slipped over the sleeve 5. The split ring 17 is then placed in position. Snap ring 13 is then worked into position between shoulder 13 and race 19, after which the seal 15 is located in its groove. Thereafter the shank 2 of the blade 1 is mounted upon the driving sleeve 4. The split sleeve 22 is then placed around the assembly, which causes the upper race 18 to fit snugly against the ring 17, which in turn fits against the shoulder 14. The bolts 23 and 24 are then attached and the halves of the clamp 22 are bolted together.

The hub 5 is provided at the left-hand end towards the engine with a cone sleeve 25 which engages with a cone locking ring 26 so that the hub is locked between this cone lock 25—26 and the cone locking ring 11a. Such details form no essential part of the invention but are recited in order to explain one type of mechanism for mounting the driving hub 5 on the engine shaft.

*Counterbalancing mechanism*

One of the clamping halves of the clamp 22 is provided with a counterbalancing weight designated 27 which extends outwardly and towards the axis of the drive shaft 7 so that the center of gravity comes as close to the major axis of the shaft 7 as is feasible. This counterbalancing block is mounted by the screws 28 upon the inner end of one half of the clamp 22. It is radially disposed with respect to the longitudinal axes of the blades about which they rotate when they are adjusted. These counterbalancing weights move bodily with the blades as they rotate bodily about the longitudinal axis of the shaft 7. These counterbalancing weights, under the influence of centrifugal force, tend to move the propeller blades in one direction. Centrifugal force moves the blades into high pitch, and the hydraulic mechanism hereinafter described is used to decrease the pitch. It is generally preferable to have the hydraulic jack reduce the pitch so that if the fluid pressure fails, the pitch will remain at the high stop. Hydraulic pressure increases pitch, while the counterweight plus blade centrifugal moment decreases pitch; I can use the blade only to decrease pitch because aerodynamic forces tend to increase pitch, such effect being at the maximum during take-off.

*Hydraulic actuating mechanism*

The inner end of the clamp 22 is provided with a cap screw 29. Mounted on this cap screw and retained by the head on the cap screw is a thrust pin or pitman having an eye 30 mounted on the stud and having its base attached to the thrust ring 31, which is attached by the set screw 32 to the inner ball race 33 of the ball bearing, including the balls 34 and the outer race 35. The ring 31 is provided with a sleeve 36.

The ball bearing just described fits within a recess 37 in the piston 38. This piston is provided with piston sealing rings 39 and 39a. It reciprocates within a cylinder 40 which is bolted by the bolts 41 on the stationary crankcase 42. This cylinder carries guide pins 43 which are mounted in the passageways 44 of the piston 38 to guide it in its reciprocation and to prevent its rotation. It will be understood that while the ball bearing, consisting of the races 33—35 and the balls 34, reciprocates bodily with the piston 38, the ring 31 with its pitman thrust member 30 both reciprocates and rotates. Therefore, the propeller is free to rotate with the shaft 7 of the engine but it may have the angularity of its blades adjusted according to the position of the hydraulic piston 38.

The control of the position of this piston in its movement in its direction is through the introduction of hydraulic pressure into the cylinder 40 in the space 45.

This is accomplished as follows. There is mounted on the face of the piston 38 by bolts 46 a T-shaped block having a horizontal passageway 47 registering with a horizontal passageway 48 in the piston 38, which passageway 48 is in communication with the space 45 behind the piston. The passageway 47 is in communication with a vertical passageway 49 in the block 50. The upper end of the block 50 is mounted upon a tube 51 which has a port 52 in registration with the passageway 49. The block 50 and the tube 51 move together with the piston 38. This tube is provided with diagonally disposed apertures 53 and 54, which register respectively with the passageway 55 which communicates with the source of fluid pressure and with the passageway 56 which extends to an exhaust. The end of the tube 51 is closed by a plug 57.

Surrounding this tube 51 is a reciprocating sleeve or servo-valve housing which cooperates with the sleeve 51 to form a servo-valve. This valve member is connected to linkage 58 that extends into the cockpit adjacent to the hand of the pilot operating the mechanism. It is provided with the ports 55 and 56 which are connected by suitable piping, preferably flexible tubing, to a source of hydraulic pressure and to an exhaust respectively.

In Figure 8 the parts are shown in locking position to hold the blades in the position to which they have been adjusted.

Figure 9 shows the parts in position to decrease the pitch of the propeller.

Figure 10 is in the exhaust position to permit the fluid to be exhausted and the pitch to be increased due to the centrifugal force working upon the counter-balancing arms 27.

It will be noted that the cylinder reciprocates under the influence of the linkage 58. Therefore, no mechanical load need be carried by the cylinder as it is light in weight and only necessitates the movement of its own dead weight. This eliminates one of the difficulties with adjusting mechanisms in connection with adjusting of blade position of aircraft propellers. No work is done directly by the pilot. He simply adjusts the position of the cylinder around the stem 51.

It will be understood that centrifugal force will impart rotative movement to the propeller blade, which will tend to decrease pitch, and aerodynamic movement will in turn tend to increase the pitch.

It will be understood that it is desired to comprehend within this invention and the hereinafter appended claims, such changes and modifications as may be necessary to adapt this invention to various conditions of uses.

Having thus fully described my invention, what I claim as new and desire to secure by Letters Patent, is:

1. In combination, in an adjustable propeller mechanism, of a drive shaft, an engine casing, a plurality of propeller blades rotatably mounted upon said shaft and adapted to turn therewith bodily, a thrust plate and associated linkage eccentrically connected to said propeller blades and adapted to bodily rotate with said blades and with said shaft and to actuate said blades about their longitudinal axes, hydraulic means comprising a cylinder mounted on said engine case, a piston mounted therein arranged around said shaft, a bearing mounted within said cylinder and within a portion of said piston adapted to engage said piston on one side and said thrust plate on the other side whereby said bearing is located between said thrust plate and said piston, hydraulic fluid conducting means connected to said piston and adapted to reciprocate with it and so arranged as to deliver hydraulic fluid through said piston into the cylinder behind the piston, and a servo valve associated with said hydraulic means.

2. In combination, in an adjustable propeller mechanism, of a drive shaft, an engine casing, a plurality of propeller blades rotatably mounted upon said shaft and adapted to turn therewith bodily, a thrust plate and associated linkage eccentrically connected to said propeller blades and adapted to bodily rotate with said blades and with said shaft and to actuate said blades about their longitudinal axes, hydraulic means comprising a cylinder mounted on said engine case, a piston mounted therein arranged around said shaft, a bearing mounted within said cylinder and within a portion of said piston adapted to engage said piston on one side and said thrust plate on the other side whereby said bearing is located between said thrust plate and said piston, hydraulic fluid conducting means connected to said piston and adapted to reciprocate with it and so arranged as to deliver hydraulic fluid through said piston into the cylinder behind the piston, a servo valve associated with said hydraulic means, said servo valve comprising a ported sleeve, the interior of which is in fluid communication through said piston to said cylinder, and means of supplying and removing hydraulic fluid therefrom adapted to be placed in communication with the interior of said ported means to supply fluid and evacuate it by reciprocation of said sleeve.

3. In combination, an annular cylinder, means for fixedly mounting said annular cylinder on an engine crankcase around an engine shaft extending therefrom, an annular piston mounted in said cylinder, guide means slidably connecting said cylinder and piston to prevent relative rotation therebetween, said piston having a port extending therethrough, a metering valve comprising a servo-mechanism connected to said port, said mechanism comprising a ported tubular member mounted on said piston for travel with said piston and connected with said port, a slidable sleeve mounted exteriorly on said tubular member and having inlet and outlet ports for hydraulic pressure fluid connecting with said ported tubular member, and actuating means connecting with said sleeve and adapted to extend to a remote control position.

4. In combination, a cylinder comprising a hollow annulus open at one side thereof, said cylinder having means for fixedly mounting the same on an engine crankcase with the central opening of the annulus positioned around an engine shaft extending from the crankcase, a piston comprising an annulus reciprocably mounted in said cylinder with one face of the piston exposed externally of the cylinder, anti-friction bearing means carried by said piston, an annularly arranged thrust means positioned adjacent the exposed face of said piston and carried by said anti-friction bearing means for relative movement between the said piston and said thrust means, link means extending from said thrust means for engagement with blades of a propeller to rotate the same on their own axes for changing pitch of the propeller blades, guide means slidably connecting said piston and said cylinder to prevent relative rotation therebetween, a port extending between opposite face sides of said piston for conduction of fluid to between said piston and said cylinder, and a servo-control mechanism connected with said port, said servo-control mechanism comprising a ported tubular member mounted on the exposed face of said piston for travel with said piston, an exteriorly arranged sleeve slidably mounted on said tubular member and having inlet and outlet ports for supply and exhaust of hydraulic fluid to and from said tubular member, and actuating means connecting with said sleeve for actuation thereof from a remote position.

5. A structure as defined in claim 1 including, a guide member slidably connecting said cylinder and said piston to prevent relative rotation therebetween.

6. A structure as defined in claim 3 including, an anti-friction bearing comprising a double annulus with anti-friction bearing elements therebetween mounted within said piston, a thrust plate connected to the inner of said bearing annulus, and linkage connected to said thrust plate at one end and adapted for connection to a propeller at the other end.

7. A structure as defined in claim 4 in which the annularly arranged thrust means has a radially disposed flange in juxtaposition to the said anti-friction bearing means, and in which the link means extends from the said flange of the thrust means.

8. A structure as defined in claim 4 in which the said ported tubular member has one portion thereof mounted on the exposed face of the piston relatively radial to the piston and a second portion thereof positioned relatively parallel with the axis of the piston and exteriorly of the cylinder.

DAVID BIERMANN.

REFERENCES CITED

The following references are of record in the file of this patent:

UNITED STATES PATENTS

| Number | Name | Date |
| --- | --- | --- |
| 1,550,550 | McCauley | Aug. 18, 1925 |
| 1,630,809 | Simpson | May 31, 1927 |
| 1,630,810 | Simpson | May 31, 1927 |
| 1,990,814 | Castro | Feb. 12, 1935 |
| 2,032,254 | Caldwell | Feb. 25, 1936 |
| 2,032,255 | Caldwell | Feb. 25, 1936 |
| 2,105,843 | Preston et al. | Jan. 18, 1938 |
| 2,123,057 | Martin | July 5, 1938 |
| 2,223,081 | Thomas | Nov. 26, 1940 |
| 2,364,672 | Stevenson | Dec. 12, 1944 |
| 2,372,416 | Fairhurst | Mar. 27, 1945 |
| 2,377,386 | Stalker | June 5, 1945 |
| 2,396,361 | Browne | Mar. 12, 1946 |
| 2,415,181 | Johnson | Feb. 4, 1947 |
| 2,425,261 | Murphy et al. | Aug. 5, 1947 |

FOREIGN PATENTS

| Number | Country | Date |
| --- | --- | --- |
| 519,261 | Great Britain | Mar. 20, 1940 |